United States Patent [19]
Poindexter

[11] Patent Number: 5,618,150
[45] Date of Patent: Apr. 8, 1997

[54] CARGO HANDLING ASSEMBLY

[76] Inventor: David A. Poindexter, 708 Patterson St., Stoughton, Wis. 53589

[21] Appl. No.: 594,829

[22] Filed: Jan. 31, 1996

Related U.S. Application Data

[63] Continuation of Ser. No. 203,897, Mar. 1, 1994, abandoned.

[51] Int. Cl.$^6$ .................................................. B65G 67/02
[52] U.S. Cl. ........................ 414/477; 414/462; 414/478; 414/522
[58] Field of Search .................................. 414/469, 477, 414/478, 479, 480, 540, 542, 779, 781, 782, 784, 545, 546, 549, 462, 522, 541, 556; 298/12

[56] References Cited

U.S. PATENT DOCUMENTS

| | | | |
|---|---|---|---|
| 3,381,835 | 12/1965 | Lee | 214/450 |
| 3,620,391 | 11/1971 | Fujioka | 214/38 A |
| 3,807,592 | 4/1974 | Lynn et al. | 214/450 |
| 4,023,690 | 5/1977 | Goode | 214/146.5 |
| 4,081,095 | 3/1978 | Wilburn et al. | 214/450 |
| 4,251,178 | 2/1981 | Bourgraf et al. | 414/343 |
| 4,278,387 | 7/1981 | Seguela et al. | 414/462 |
| 4,297,071 | 10/1981 | Dunbar | 414/542 |
| 4,354,791 | 10/1982 | Antonellis | 414/343 |
| 4,573,854 | 3/1986 | McFarland | 414/462 |
| 4,621,972 | 11/1986 | Grotte | 414/477 |
| 4,647,110 | 3/1987 | McKee | 298/1 |
| 4,728,244 | 3/1988 | Stokkendal | 414/462 |
| 4,950,123 | 8/1990 | Brockhaus | 414/522 |
| 5,096,361 | 3/1992 | Crawford | 414/462 |

FOREIGN PATENT DOCUMENTS

| | | | |
|---|---|---|---|
| 2619768 | 3/1989 | France | |
| 2105296 | 7/1982 | United Kingdom | |

*Primary Examiner*—Karen B. Merritt
*Assistant Examiner*—Stephen Gordon
*Attorney, Agent, or Firm*—Godfrey & Kahn, S.C.

[57] ABSTRACT

A cargo handling assembly for use in an overland vehicle including a base frame which is capable of being mounted on the floor of the overland vehicle. A pair of extension members is individually borne by the base members. The exterior members are moveable along a predetermined path of travel from a first, stowed position, to a second, deployed position. A pair of carriages is slidably borne by the individual extension members. The carriages are moveable along a path of travel from a first position, where the respective carriages are located in spaced relation relative to the distal end of the respective extension members, to a second position, where the carriages are located near the distal end of the respective extension members. A cargo support assembly having a top end is rotatably connected to each individual extension member at a single pivot point. The top end of the cargo support assembly is rotatably moveable along an arcuately shaped path of travel from a first position, where the cargo support assembly is disposed in spaced relation relative to the surface of the earth, to a second position, where the cargo support assembly is disposed in an orientation which facilitates the removal of cargo from the cargo support assembly.

15 Claims, 6 Drawing Sheets

CARGO HANDLING ASSEMBLY

CROSS REFERENCE TO RELATED APPLICATION

The present application is a continuation of Ser. No. 08/203,897, filed Mar. 1, 1994 now abandoned.

BACKGROUND OF THE INVENTION

1. Field of the Invention

The present invention relates to a cargo handling assembly. More particularly, the present invention relates to a cargo handling assembly which may be employed in combination with overland vehicles such as standard-sized passenger vans, minivans, and other similarly designed vehicles; can be easily installed in such vehicles without modifying them; and is operable to load and unload bulky, heavy cargo in a highly efficient fashion.

2. Description of the Prior Art

The prior art is replete with numerous examples of cargo handling assemblies which are adapted to manipulate or otherwise handle cargo which is being loaded or unloaded from various overland vehicles such as railroad cars, automobiles, trucks and the like. These prior-art cargo handling assemblies normally require some modification of the various overland vehicles in order to render the devices operational. Typically, the overland vehicles are less useful when modified and, sometimes, aesthetically unappealing following the modification. In addition, the prior-art cargo handling assemblies, as a general matter, have been considered rather cumbersome, and frequently unduly complex, thereby rendering these devices somewhat expensive to manufacture and difficult to install and maintain.

In addition to the shortcomings noted above, many of the prior-art cargo handling assemblies often have a design which requires the operator to expend substantial amounts of strength to load or unload the cargo, as the case may be, because these devices do not orient the cargo in an appropriate position for ease of handling. Consequently, many of the prior-art devices, while useful, cannot be operated by the elderly, handicapped, or people having small amounts of strength.

Therefore, it would be desirable to have a cargo handling assembly which is operable to handle heavy cargo, and which further can be quickly installed in an overland vehicle without the modification of same, and which additionally, increases the ease, and speed with which heavy cargo may be transported and delivered.

SUMMARY OF THE INVENTION

Therefore, it is an object of present invention to provide an improved cargo handling assembly for overland vehicles and the like.

Another object of the present invention is to provide a cargo handling assembly which has particular utility when utilized in combination with an overland vehicle such as a standard-sized van, minivan, or similar vehicle which has a cargo area, and which may be accessed through a side or rear door.

Another object of the present invention is to provide a cargo handling assembly which may be readily installed on an overland vehicle's floor without substantial modification to it.

Another object of the present invention is to provide a cargo handling assembly by which a cargo support assembly may be moved, or extended, from a position inside the cargo area of an overland vehicle to position outside the cargo area and, at that extended position, be pivoted or rotated on a single pivot point so that the end of the cargo support assembly is operable to move along an arcuately shaped path of travel from a first position, where the cargo support assembly is disposed in predetermined spaced relation relative to the surface of the earth, to a second position, where the cargo support assembly is disposed in an substantially vertical orientation relative to the surface of the earth, and where such motion permits cargo to be unloaded easily from the cargo support assembly.

Another object of the present invention is to provide an assembly which includes a means for assisting in the movement of the end of the cargo support assembly along the arcuately shaped path of travel.

Another object of the present invention is to provide an assembly which permits the loading of relatively tall equipment or cargo in a cargo area of relatively limited height.

Another object of the present invention is to provide an assembly which is characterized by speed and ease with which cargo can be loaded and unloaded from an overland vehicle, and which further can be sold and maintained at a relatively moderate cost.

These and other objects and advantages are achieved in a cargo handling assembly for an overland vehicle which includes a base frame having a pair of non-moveable support members which are capable of being releasably mounted on the overland vehicle; a pair of extension members which are individually slidably borne by the respective support members and which are moveable along a predetermined path of travel from a first, stowed position, to a second, deployed position. The individual extension members each have a proximal end, and an opposite distal end; and a cargo support assembly is connected to the individual extension members. The cargo support assembly has an end which is rotatably moveable along an arcuately shaped path of travel from a first position, where the cargo support assembly is disposed in a substantially horizontal position, to a second position, where the cargo support assembly is disposed in a substantially vertical position. A pair of carriages is individually slidably mounted on and borne by the respective extension members. The pair of carriages is moveable along a path of travel from a first position, where the carriages are located in spaced relation relative to the distal end of the respective extension members, to a second position, where the individual carriages are located near the distal end of the respective extension members. The cargo support assembly is rotatably mounted on the individual carriages.

DESCRIPTION OF THE PREFERRED EMBODIMENT

Figure 1:
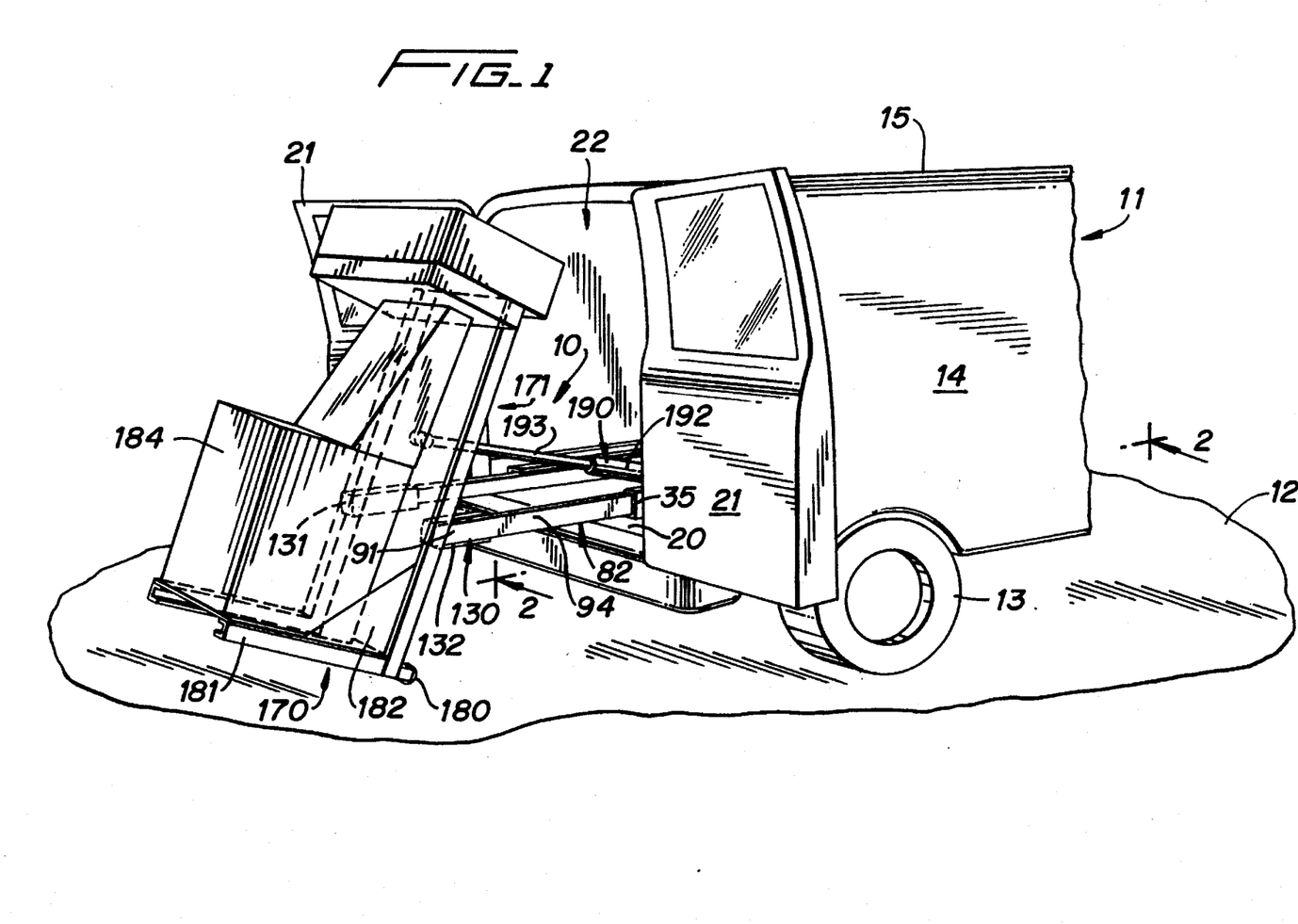
FIG. 1 is a perspective, environmental view of the cargo handling assembly of the present invention and is shown in a typical operative configuration where it is installed on an overland vehicle which is depicted as a passenger van of conventional design.

The cargo handling assembly of the present invention is generally designated by the numeral 10 in FIG. 1. While the present invention is herein shown and described as being useful in combination with an overland vehicle such as a minivan, or standard-sized van of conventional design, the present cargo handling assembly may be rendered useful with other overland vehicles such as trucks, buses, and other similar vehicles.

The cargo handling assembly 10 is operable to be releasably mounted on an overland vehicle 11. The overland vehicle 11 is operable for movement along the surface of the earth 12 by means of earth engaging wheels 13. The overland vehicle has sidewalls 14, a roof 15, and a floor 20.

The overland vehicle has a pair of rear doors 21 which allow access to a cargo area 22 which is defined by the rear walls 14, the roof 15, and the floor 20. Overland vehicles such as minivans, and standard-sized vans, when purchased as passenger vans, have floor mounts (not shown) which permit removable seating to be secured on the floor 20, thus allowing the van to accommodate seven or more passengers. When the seating is removed, a cargo area 22 is created which can receive large or bulky cargo. As will be appreciated, the floor mounts (not shown) which are installed on the floor 20 of the overland vehicle are positioned a given distance apart and these mounts are operable to secure the cargo handling apparatus 10 in a releasably fixed location relative to the cargo area 22. The cargo handling assembly is secured to the individual mounts by employing fasteners and other similar assemblies which are well understood by those skilled in the art. Thus, the present assembly may be easily installed in a van of conventional design without modifying the vehicle.

The cargo handling assembly 10 of the present invention includes a base frame which is generally indicated by the numeral 30, and is releasably fixed, as noted above, on the floor 20 of the overland vehicle 11. The base frame includes first and second support members 31 and 32, respectively, which are releasably fixed on the floor 20, and which are disposed in substantially parallel spaced relation one to the other, and with respect to the floor 20 of the overland vehicle. The individual support members each have a main body 33 which includes a first, or proximal end 34 and a second or distal end 35. Further, the main body includes a sidewall 40, and top and bottom surfaces or walls 41 and 42 which are oriented in substantially perpendicular relation relative to the side wall 40, and which further are disposed in substantially parallel spaced relation one to the other. The main body 33 further has an exterior facing surface 43, and an opposite, interior facing surface 44 which defines a channel 45 which has a given width, and length dimension.

The individual support members 31 and 32 are affixed on the floor 20 of the overland vehicle 11 by means of individual brackets which are generally indicated by the numeral 50. The brackets each have a foot 51 which is disposed in substantially facing relation relative to the floor 20 of the overland vehicle. Further, an aperture (not shown) is formed in each of the feet. Each aperture is operable to receive fasteners (not shown) or alternatively to be releasably secured to the floor mounts (not shown) which are located on the floor 20 of the overland vehicle 10.

Figure 7:
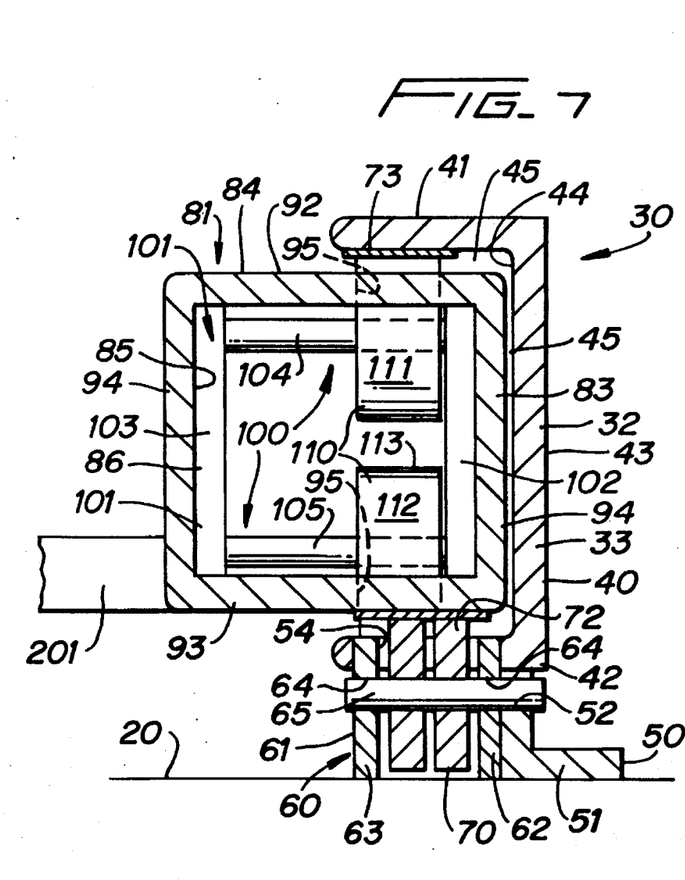
FIG. 7 is a partial, transverse, vertical sectional view taken from a position along line 7—7 of FIG. 3.

As best seen by reference to FIG. 7, the bracket 50 which is located adjacent the distal end 35 of the first and second support members 31 and 32, respectively, has an aperture 52 formed therein. Further, and as best seen in FIG. 7, an aperture 54 of predetermined dimensions is formed in the distal end 35 of the bottom wall 42. A first bearing assembly 60 is mounted on the base frame 30. The first bearing assembly 60 has a bearing housing 61 which includes, a first wall 62, and a second wall 63 which is disposed in predetermined substantially parallel spaced relation relative to the first wall. As best seen by reference to FIG. 7, the first wall 62 is disposed in flush, facing relation relative to the bracket 50. Coaxially aligned apertures 64 are formed in the first and second walls, and an axle 65 is received through the coaxially aligned apertures, and through the aperture 52 which is formed in the bracket 50. The axle rotatably supports a bearing member which is herein illustrated as a pair or wheels 70. The wheels each have a main body 71 which is identified by a peripheral edge 72 and extends substantially through the aperture 54 which is formed in the distal end of the respective support members. As best illustrated by reference to FIG. 7, a polymeric based substrate is adhesively applied to the interior surface 44 of the top wall 41. This substrate is employed to reduce the frictional wear experienced by the respective support members when the support members are manufactured from synthetic materials.

The cargo handling assembly of the present invention has a pair of extension members 80. Each extension member 80 is individually operable to slidably coact with each of the first and second support members 31 and 32, respectively. The individual extension members include a first member 81 and a second member 82. Each of the extension members have a main body 83, which has an exterior facing surface 84 and an opposite interior facing surface 85. The interior facing surface defines a cavity 86. Further, the main body has a first, or proximal end 90, and a second, or distal end 91. The main body also has a top surface 92, a bottom surface 93, and a pair of sidewalls indicated by the numeral 94. The extension members 80 also have a given length, width, and length dimension. The height dimension of the extension members is less than the distance between the top and bottom walls 41 and 42 of the individual support members 31 and 32, respectively. As best seen by reference to FIG. 7, a pair of apertures 95 is formed in the top and bottom surfaces 92 and 93 and are positioned closely adjacent to the proximal end 90.

Figure 6:
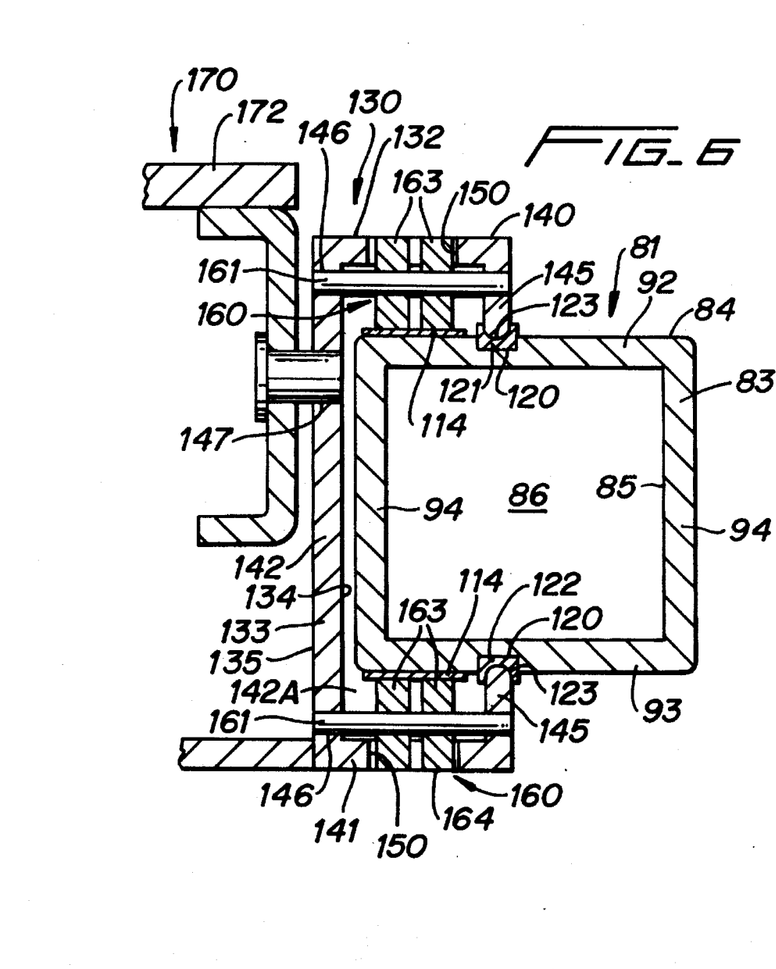
FIG. 6 is a partial, transverse, vertical sectional view taken from a position along line 6—6 of FIG. 3.

As been seen by reference to FIGS. 6 and 7, the individual extension members 80 each have a second bearing assembly which is generally indicated by the numeral 100. The second bearing assembly 100 is located adjacent the proximal end of the individual extension members, and further is located in the cavity 86. The second bearing assembly includes a bearing housing 101 which includes first and second walls 102 and 103, respectively. The first and second walls are individually received in the cavity 86 and are secured on the main body of the respective extension members 83 by a suitable fastening technique such as by welding or utilizing various fasteners and the like. The first and second walls have apertures formed therein (not shown) which are operable to receive first and second axle assemblies 104 and 105, respectively. As best seen in FIG. 7, the individual axle assemblies are disposed in a substantially horizontal orientation, and are fixed in predetermined spaced relation one to the other. The individual axle assemblies 104 and 105, respectively, are operable to rotatably mount individual bearing members 110, which are herein shown and described as a first and second wheels 111 and 112, respectively. The first and second wheels have a peripheral edge 113. As best seen by reference to FIG. 7, the first and second wheels are received through the apertures 95 and are operable to engage the interior facing surface 44 of the first and second support members 31 and 32, respectively. Therefore, the second bearing assembly 100 renders the individual extension members substantially telescopingly moveable relative to the fixed support members. This feature of the present invention will be discussed in greater detail hereinafter.

As best seen in FIG. 6, individual polymeric based substrates 114 are fixed in predetermined positions on the top and bottom surfaces 92 and 93, of the exterior facing surface 84, of the individual extension members 80. These substrates operate in the fashion as discussed earlier with respect to the polymeric substrate 73. A guide channel 120, of predetermined dimensions, is formed in a predetermined location in the top and bottom surfaces of the individual extension members and is operable to receive first and second channel members 121 and 122, respectively. These individual channel members are substantially identical in their shape, and further have a u-shaped channel 123 formed therein. The u-shaped channel is operable to coact with individual carriages 130 which will be discussed in the paragraphs which follow.

As shown in FIGS. 1, 6, and 7, the cargo handling assembly 10 of the present invention includes a pair of non-jointed carriages 130. The carriages 130 are individually slidably borne by the respective extension members 80. The individual carriages include a first carriage 131, and a second carriage 132. Each of the carriages are a mirror image of the other. Each carriage includes a main body 133, which has an interior facing surface 134, and an opposite, exterior facing surface 135. space As best seen by reference to FIG. 6, the main body 133 has a top surface 140, and an opposite bottom surface 141. A side wall 142 connects the two surfaces. The top and bottom surfaces are disposed in a substantial normal attitude relative to the side wall 142. The top and bottom surface as well as the side wall define a channel 142A which has a given length width and height dimensions. Further, each of the carriages has a first or proximal end 143, and an opposite, distal or second end 144.

Figure 5:
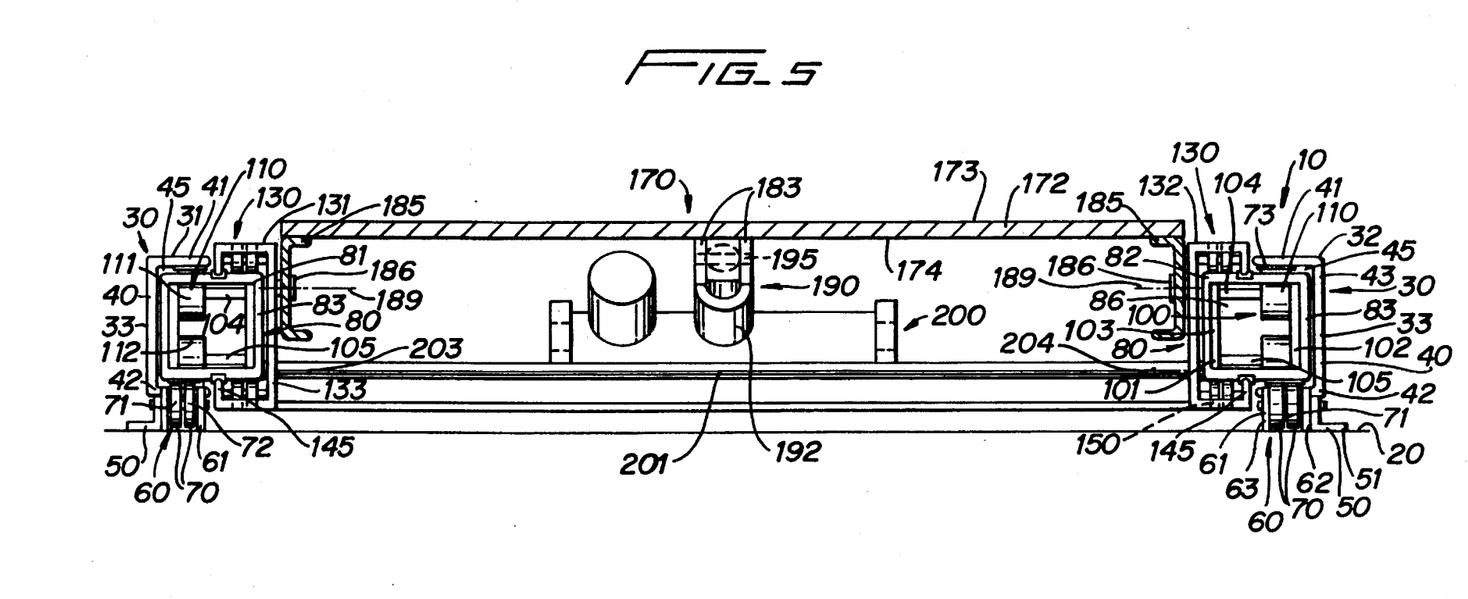
FIG. 5 is a partial, transverse, vertical sectional view taken from a position along line 5—5 of FIG. 2.

As best seen in FIG. 5, each of the carriages 130 includes a guide assembly or member 145 which is connected to the top and bottom surfaces and which extends substantially normally inwardly relative thereto. As best appreciated by a study of FIG. 6, the individual guide members are substantially aligned one with the other and are positioned a given distance apart. This distance is equal to, or slightly greater than, the distance between the u-shaped channels 123 which are defined by the first and second channel members 121 and 122, respectively. Therefore, the individual guide assemblies or members 145 are operable to matingly coact with the first and second channel members 121 and 122, respectively, thereby defining a substantially linear course of travel for the individual carriages 130. The path of travel of the carriages will be discussed in greater detail hereinafter.

Figure 3:
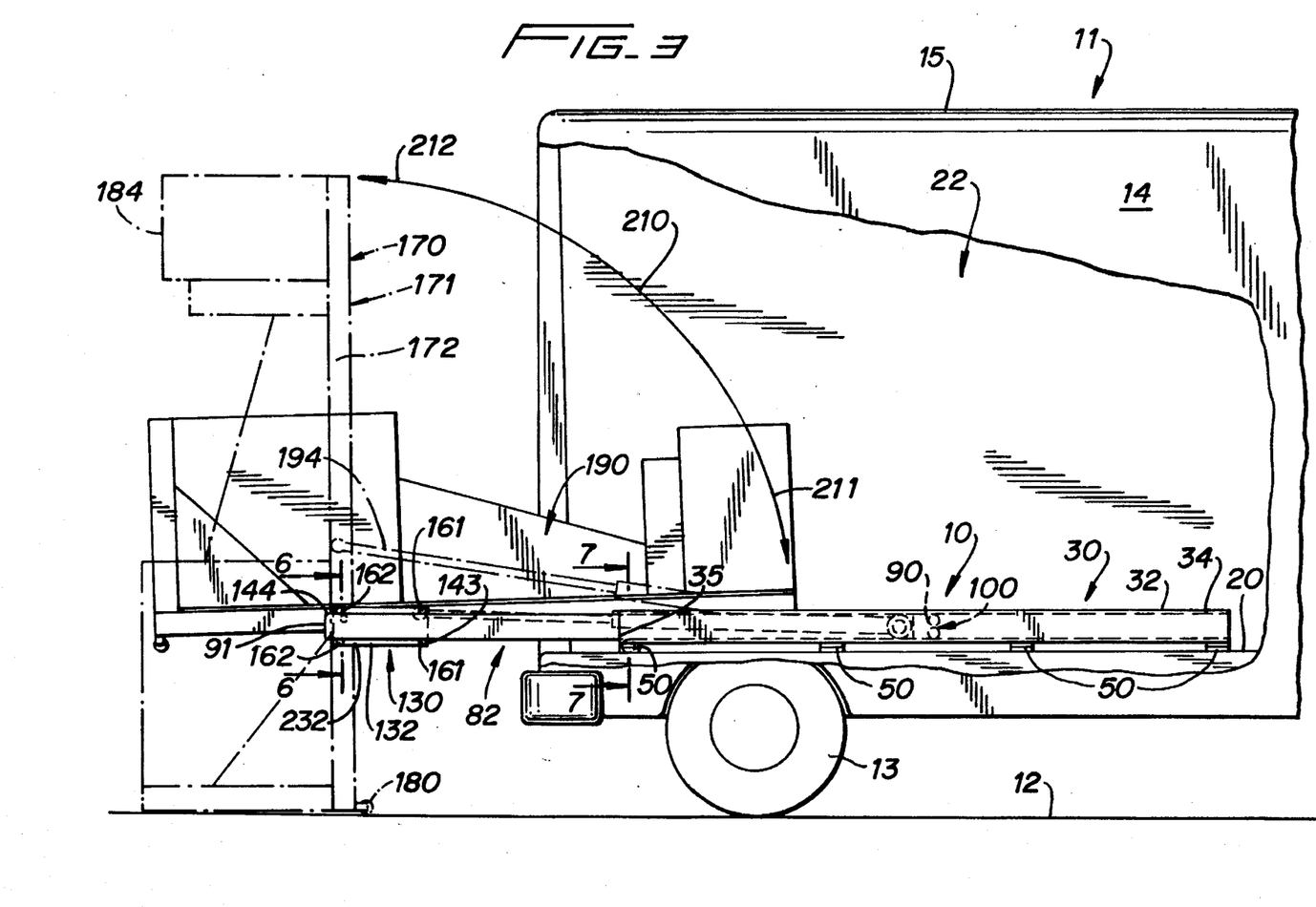
FIG. 3 is a partial, environmental, side elevation view of the cargo handling assembly of the present invention and illustrates, in phantom lines, the movement of the cargo from the overland vehicle to an orientation where it can be removed from the cargo handling assembly.

As best seen by reference to FIG. 6, and by a study of FIG. 3, four apertures of substantially identical dimension 146 are formed in predetermined positions in the proximal and distal ends of the sidewall 142, and the guide assembly or members 145. Further, a larger aperture 147 is formed in the sidewall 142 and is operable to receive a fastener which allows a cargo support assembly to rotate thereabout. This fastener and the cargo support assembly will be discussed in greater detail hereinafter. Two pairs of apertures 150 are formed in the top and bottom surfaces 140 and 141 of the main body 133. The two pairs of apertures 150 are individually located adjacent the proximal and distal ends of the top and bottom surfaces.

The individual carriage assemblies 130 include a third bearing assembly 160. As best seen by reference to FIGS. 3 and 6, the third bearing assembly includes a first pair of axles 161 which are located near the proximal end 143 of the main body 133, and a second pair of axle assemblies 162 which are located near the distal end 144. The respective axles are supported in the coaxial aligned apertures 146 and are each operable to support a pair of wheels 163 which extend through the apertures 150 which are formed in the top and bottom surfaces 140 and 141, respectively. The pair of wheels each have a peripheral edge 164 which is operable to engage the exterior surface 84 of the individual extension members 80. Therefore, the individual carriages are rendered longitudinally and slidably moveable about the exterior surface of the extension members and are guided along a predetermined substantially linear course of travel by the individual guide assemblies 145 which are matingly received in the u-shaped channels 123. The significance of this feature will become evident hereinafter.

Figure 4:
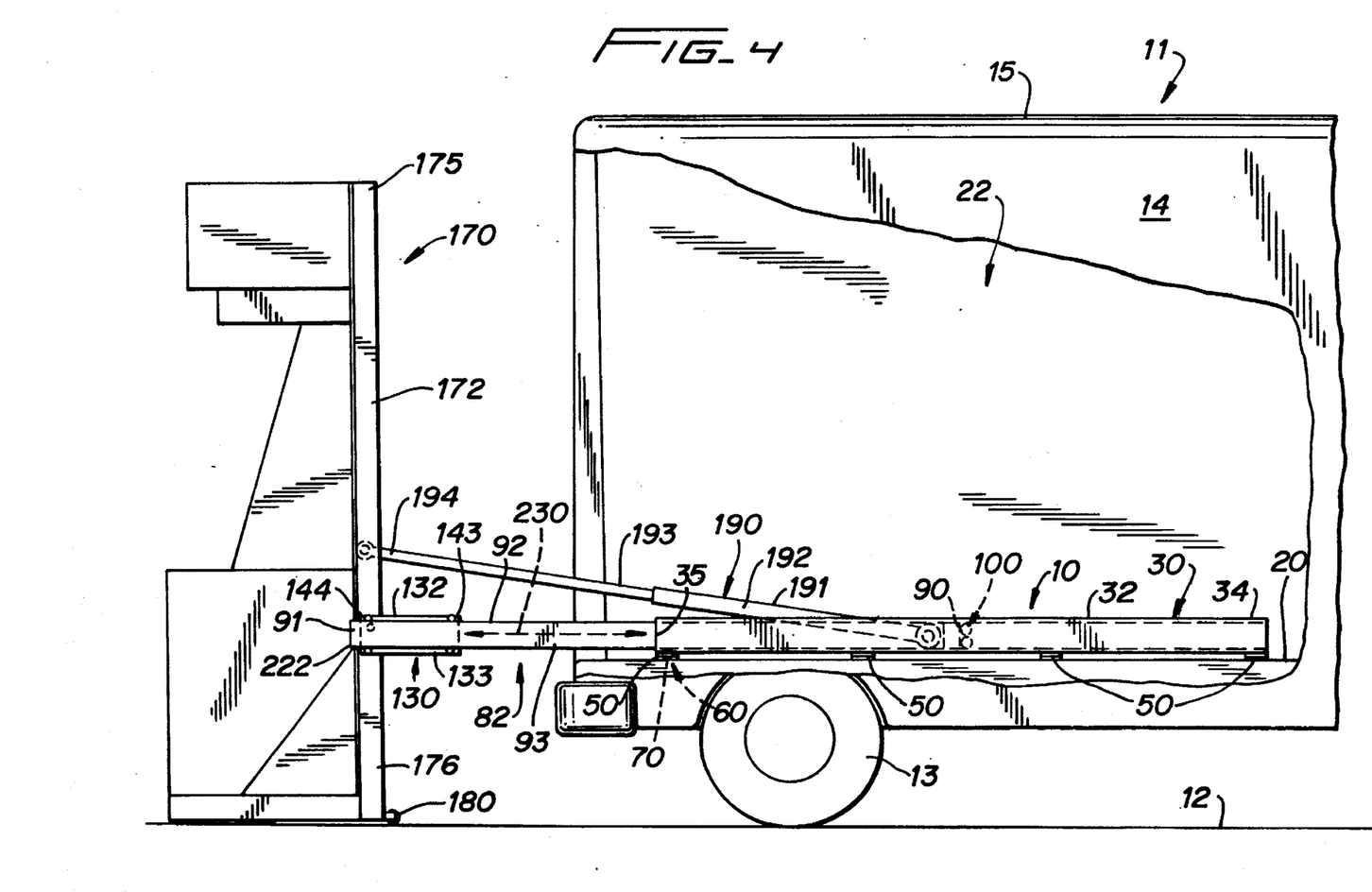
FIG. 4 is a partial, environmental, side elevation view of the cargo handling assembly when oriented in a position to receive or discharge cargo from the cargo support assembly.

The cargo support assembly is generally indicated by the numeral 170 in FIG. 1. As shown therein, the cargo support assembly has a main body 171 which includes a rear support panel 172 which has a forwardly facing surface 173, a rearwardly facing surface 174, a first or top end 175, a second, distal or earth engaging end 176 (FIG. 4). As seen by additional reference to FIGS. 3 and 4, an earth engaging wheel assembly 180 is mounted on the distal end of the rearwardly facing surface 174. The earth engaging wheel assists, or otherwise facilitates, the rotation or pivoting of the cargo support assembly 170.

The cargo support assembly also includes a base or floor member 181 which is fixed to the rear support panel 172 by welding or the like and further is strengthened, by a pair of triangular shaped sidewalls 182. As best seen by reference to FIG. 5, a bracket 183 is fixed, as by welding or the like, to the rearwardly facing surface 174 and is operable to receive the distal end of a ram which will be discussed hereinafter. The cargo support assembly is shown supporting a piece of analytical equipment 184 which is secured on the cargo support assembly, referred to hereinafter as the "cargo." A pair of mounting brackets 185 are fixed on the rear support panel 172 and operate to receive a fastener 186. The fastener is received in the aperture 147 thereby enabling the cargo support assembly 170 to rotate about the fastener. The cargo support assembly is mounted to the distal end portion of each of the individual carriages at a single pivot point, e.g., the fastener 186, on each respective carriage. The cargo support assembly 170 is rotatably moveable on a single axis 189 (FIG. 5) in space, which is substantially perpendicular to, the distal end portions of each of the individual carriages and, therefore, the individual extension members. Thus, the top end 175 of the cargo support assembly 170 is rotatable about a single axis.

The assembly 10 of the present invention includes a means for assisting in the movement of the top end 175 of the cargo support assembly 170 along its respective path of travel. The movement means 190 may include a number of different mechanisms but is herein illustrated as including a hydraulic cylinder 191 of conventional design. The hydraulic cylinder is connected in fluid flowing relation relative to a source of hydraulic fluid, under pressure, (not shown). The hydraulic cylinder 191 includes a cylinder body 192 which mounts a moveable ram 193 of conventional design. The ram has a distal end 194 which is connected by means of a pin 195 in pivotal force engaging relation relative to the brackets 183.

Figure 2:
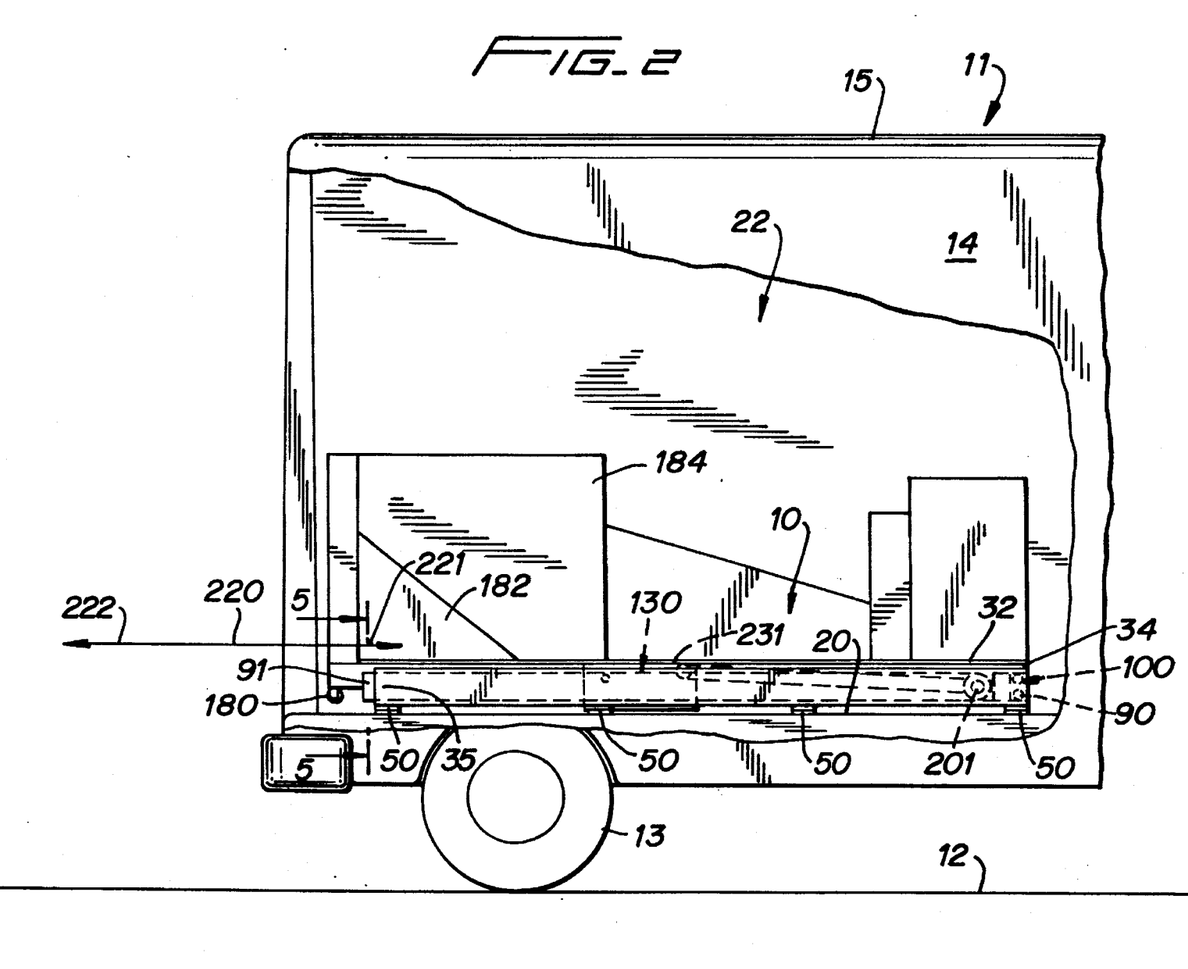
FIG. 2 is a partial, environmental, side elevation view of the cargo handling assembly of the present invention as seen along 2—2 of FIG. 1 and shows the cargo handling assembly, with cargo, as it would appear when located in the cargo area of the overland vehicle.

The hydraulic cylinder 191 is borne by the individual extension members and is moveable therewith (FIG. 5). The cylinder 192 is connected to a base member 200 which is further borne by a support beam 201. The support beam 201 has a first end 203, and an opposite second end 204 which is fastened by welding, or the like, on the individual extension members 80 and is thereby rendered moveable therewith. Extension or retraction of the ram 193 causes the top end 175 of the cargo support assembly 170 to move along a path of travel 210 from a first position 211, where the rear support panel 172 is disposed in a substantially horizontal orientation and the cargo handling assembly 170, including the mounting brackets 185, is in a nested relationship relative to the carriages 130 and extension members 80, to a second, vertical position 212 which is shown in phantom lines in FIG. 3, where the rear support panel is oriented in a substantially horizontal attitude, or in other words, in an orientation which facilitates the removal of the cargo 184 from the cargo support assembly 170. As earlier discussed, the individual extension members slidably coact with the respective support member and are moveable along a predetermined path of travel 220 from a first position 221, where the distal end 91 of the respective extension members are positioned closely adjacent to the distal end 35 of the individual support members 31 and 32; to a second position 222, where the distal ends of the respective extension members 91, and support members 35 are spaced a predetermined distance apart. As best seen by reference to FIG. 2 and 3, the pair of carriages 130 are individually and slidably borne by the respective extension members 80 and are moveable along a path of travel 230 from a first position 231, where the carriages are located in spaced relation relative to the distal end 91 of the respective extension members 80, to a second position 232, where the individual carriages are located at, or near the distal end 91 of the respective extension members. As earlier discussed, the various bearing assemblies of the present device facilitate the movement of the cargo support assembly from a position interior of the overland vehicle 11, to a position where the top end 175 of the cargo support assembly 170 can be rotated along its arcuately shaped path of travel 210 into a position which allows the cargo 184 to be removed therefrom.

Operation

The cargo handling assembly 10 includes a base frame 30 which has first and second support members 31 and 32 respectively, which are capable of being releasably mounted on an overland vehicle. A pair of extension members 80 is individually slidably borne by the respective support members. The individual extention members are moveable along a predetermined path of travel 220 from a first position 221, to a second, deployed position 222. Two carriages 130 are individually slidably borne by the respective extension members. The carriages are moveable along a path of travel 230 from a first position 231, where the respective carriages are located in spaced relation relative to the distal end 91 of the respective extension members, to a second position 232, where the individual carriages are located near the distal end 91 of the respective extension members. A cargo support assembly 170 is rotatably borne by the individual carriages.

The top end 175 of the cargo handling assembly 170 is rotatably moveable along an arcuately shaped path to travel 210 from a first position 211, where the cargo support assembly is disposed in a substantially horizontal position, and in predetermined spaced relation relative to the surface of the earth 12, to a second position 212, where it is substantially vertically oriented, and where the cargo 184 which is borne by the cargo support assembly 170 may be easily removed. The cargo support assembly is mounted on the distal end portion of each of the individual carriages at a single pivot point on each respective carriage. The cargo support assembly is rotatably moveable on a single axis, which is substantially perpendicular to, the distal end portions of each of the individual carriages and, therefore, to the individual extension members. Because of the unique combination of slidable extension members and a single pivot point connection of the cargo support assembly to the extension members, the present invention permits the loading of relatively tall equipment or cargo into a cargo area of relatively limited height.

In particular, the cargo handling assembly 10 includes a base frame 30 having a pair of non-moveable support members 31 and 32 which are capable of being releasably borne by the overland vehicle 11. The individual support members each define a channel 45 having a given height, width, and length dimensions, and wherein the individual support members have a proximal end 34, and a distal end 35. A first bearing assembly 60 is positioned near the distal end of the respective support members. A pair of extension members 80 is borne by the respective support members and each is telescopingly received in the individual channels. The extension members have top and bottom surfaces 92 and 93, and proximal and distal ends 90 and 91 respectively. A guide channel 120 is formed in the top and bottom surfaces thereof. A second bearing assembly 100 is borne by the individual extension members and is operable to coact with the channel 45 which is defined by the individual support members 31 and 32. Two carriages 130 are individually slidably borne by the respective extension members. The individual carriages define a channel 142A which has a height dimension greater than the height dimension of the respective extension members. The respective extension members are telescopingly received in the channels 142A which are defined by the two carriages. The two carriages are moveable along a path of travel 230 from a first position 231 where the carriages are spaced a given distance from the distal end 91 of the respective extension members 80, to a second position 232 where the individual carriages are located adjacent the distal end thereof. The carriages individually coact with the respective guide channels formed in the respective extension members. A third bearing assembly 60 is borne by the respective carriages and is operable to coact with the respective extension members.

A cargo support assembly 170 is rotatably borne by the respective carriages and has a main body 171 which includes a floor 181, a support panel 172, and a top end 175. The top end 175 of the cargo support assembly 170 is moveable along an arcuately shaped path of travel 210 from a first position 211, where the cargo support assembly is disposed in spaced relation relative to the surface of the earth 12, to a second position 212, where the cargo support assembly is oriented to facilitate the removal of the cargo 184 therefrom.

The cargo handling assembly 10 further includes a movement means 190 which is herein illustrated as a hydraulic cylinder 191 and which facilitates the movement of the top end 175 of the cargo support assembly along its arcuately shaped path of travel.

Although the present invention has been herein shown and described in what is conceived to be the most practical and preferred embodiment, it is recognized that departures may be made therefrom within the scope of the invention which is not to be limited to the illustrative details disclosed.

What is claimed is:

1. A cargo handling assembly for an overland vehicle, the cargo handling assembly comprising:

a base frame having a pair of support members for being mounted on the overland vehicle;

a pair of extension members, each extension member telescoped within and slidably borne by a respective one of the support members and moveable along a path of travel between a first, stowed position and a second, deployed position, each extension member having a proximal end and an opposite, distal end;

a second frame for holding cargo, the second frame connected to each of the extension members at a single pivot point on each respective extension member, the second frame rotatable on a single axis which is substantially perpendicular to each distal end of each extension member and between a first position, where the second frame is disposed in a substantially horizontal position and lies in nested relation relative to the base frame, and a second position, where the second frame is disposed in a substantially vertical position, wherein the cargo handling assembly is capable of loading relatively tall, non-collapsable objects into a cargo area of limited height.

2. A cargo handling assembly as claimed in claim 1, wherein an earth engaging wheel for facilitating rotation of the second frame from the first position to the second position is mounted on the second frame.

3. A cargo handling assembly as claimed in claim 1, further comprising a means for assisting the movement of the second frame from the first position to the second position.

4. A cargo handling assembly as claimed in claim 3, wherein the means for assisting movement of the second frame is a hydraulic cylinder.

5. A cargo handling assembly as claimed in claim 1, further comprising a pair of non-jointed carriages each having a distal end portion, individually slidably borne by a respective one of the extension members, and moveable along a path of travel from a first position, where the carriage is located in spaced relation relative to the distal end of the respective one extension member, to a second position where the carriage is located near the distal end of the respective one extension member, wherein the second frame is mounted on each distal end of each of the carriages at a single pivot point on each respective carriage.

6. A cargo handling assembly as claimed in claim 5, wherein each respective non-jointed carriage includes a guide assembly.

7. A cargo handling assembly as claimed in claim 6, wherein each guide assembly is operable to individually slidably and matingly engage a one of the respective extension members.

8. A cargo handling assembly for an overland vehicle having a floor, the cargo handling assembly comprising:

a base frame having a pair of support members which are capable of being releasably secured on the floor of the overland vehicle and are disposed in substantially parallel spaced relation one to the other, and wherein each respective support member defines a channel, has a top surface and a bottom surface which are positioned in substantially parallel relation one to the other, proximal and distal ends, and a first bearing assembly mounted on its distal end;

a pair of extension members, each extension member telescoped within and slidably borne by a respective one of the support members and coacting with the respective one of the support members and the bearing assembly mounted on the support member, each extension member being moveable along a path of travel between a first, stowed position, and a second deployed position, and having a proximal end, an opposite distal end, a top surface, a bottom surface, and a second bearing assembly which is operable to slidably coact with the respective one of the support members, and wherein the second bearing assembly is located on the proximal end of the respective one of the extension members and slidably engages the top and bottom surfaces of the respective one of the support members, and wherein a channel is formed in the top and bottom surface of each extension member and extends substantially longitudinally thereof;

a pair of carriages, each carriage slidably borne by a respective one of the extension members and moveable along a path of travel from a first position, where the carriage is located in spaced relation relative to the distal end of the respective one of the extension members, to a second position where the carriage is located near the distal end of the respective one of the extension members, each carriage having a main body which has a top and bottom surface which defines a channel, and wherein the channel of the carriage has a width dimension which is greater than the width dimension of a respective one of the extension members, and wherein the main body further has a proximal end and an opposite, distal end, and wherein each carriage has a third bearing assembly which is mounted on its proximal end and a fourth bearing assembly mounted on its distal end each third and fourth bearing assembly operable to engage the top and bottom surfaces of the respective one of the extension members, and wherein the main body of each carriage has a guide assembly which is operable to slidably and matingly engage the channel formed in the respective one of the extension members; and a second frame having a top end and rotatably mounted on the individual carriages, the second frame moveable between a first position, where the second frame is disposed in a substantially horizontal position, and a second position, where the second frame is disposed in a substantially vertical position.

9. A cargo handling assembly for an overland vehicle, the cargo handling assembly comprising:

a base frame having a pair of support members for being mounted on the overland vehicle;

a pair of extension members, each extension member telescoped within and slidably borne by a respective one of the support members and moveable along a path of travel between a first, stowed position, and a second deployed position, each extension member having a proximal end and an opposite, distal end;

a pair of non-jointed carriages, each carriage having a distal end portions individually slidably borne by a respective one of the extension members, and moveable along a path of travel between a first position, where the carriage is located in spaced relation relative to the distal end of the respective one extension member, and a second position where the carriage is located near the distal end of the respective one extension member; and a second frame for holding cargo, the second frame having a top end and mounted on the distal end portion of each of the individual carriages at a single pivot point on each respective carriage, the top end of the cargo support assembly rotatable about a single axis which is substantially perpendicular to each distal end portion of each carriage and between a first position, where the second frame is disposed in a substantially horizontal position, and a second position, where the second frame is disposed in a substantially vertical position.

10. A cargo handling assembly as claimed in claim 9, wherein the overland vehicle has a floor and the support members are capable of being releasably secured on the floor of the overland vehicle and are disposed in substantially parallel spaced relation one to the other, wherein the respective defines a channel, has a top surface and a bottom surface which are positioned in substantially parallel spaced relation one to the other, and each support member has a proximal end a distal end, and a bearing assembly mounted on its distal end, the bearing assembly operable to slidably coact with a one of the extension members.

11. A cargo handling assembly as claimed in claim 10, wherein each extension member includes a bearing assembly which is operable to slidably coact with a one of the respective support members, and wherein the bearing assembly of the extension member is located on the proximal end of the one respective extension member and slidably engages the top and bottom surfaces of the one respective support member, and wherein each extension member includes a top and bottom surface and a channel is formed in the top and bottom surfaces of each extension member, each channel extending substantially longitudinally thereof.

12. A cargo handling assembly as claimed in claim 11, wherein each carriage has a main body which has a top and a bottom surface, which defines a channel, and wherein the channel of the carriage has a width dimension which is greater than the width dimension of the respective extension members, and wherein the main body further has a proximal end and an opposite, distal end, and wherein each carriage has a first bearing assembly mounted on the proximal end and a second bearing assembly mounted on the distal end, each bearing assembly operable to engage the top and bottom surfaces of a respective one of the extension members, and wherein the main body of each carriage has a guide assembly which is operable to slidably and matingly engage the channel formed in the respective one extension member.

13. A cargo handling assembly as claimed in claim 12, wherein the second frame includes an earth engaging wheel for facilitating rotation of the cargo support assembly from the first position to the second position.

14. A cargo handling assembly for an overland vehicle, the cargo handling assembly comprising:

a base frame having a pair of support members for being releasably mounted on the overland vehicle, each support member defining a channel;

a pair of extension members, each extension member telescoped within and slidably borne by a respective one of the support members and moveable along a path of travel between a first, stowed position, and a second deployed position, and wherein each extension member has a proximal end and an opposite, distal end; and a second frame for holding cargo, the second frame having a top end and connected to each of the extension members at a single pivot point on each respective extension member, the top end of the second frame moveable along an arcuately shaped path of travel between a first position, where the cargo support assembly is disposed in a substantially horizontal position, and a second position, where the cargo support assembly is disposed in a substantially vertical position.

15. A cargo handling assembly as claimed in claim 14, further comprising:

a pair of carriages, each carriage individually slidably borne by a respective one of the extension members and moveable along a path of travel between a first position, where the carriage is located in spaced relation relative to the distal end of of the extension members, and a second position, where the carriage is located at the distal end of respective one of the extension members; and a means for assisting in the movement of the second frame along the arcuately shaped path of travel, wherein, the second frame is mounted on a distal end of each of the individual carriages at a single pivot point on each respective carriage, the top end of the second frame rotatably moveable about a single axis which is substantially perpendicular to each distal end of each carriage.

* * * * *